(12) United States Patent
Zick

(10) Patent No.: US 9,515,476 B2
(45) Date of Patent: Dec. 6, 2016

(54) PROTECTIVE DEVICE FOR PROTECTION OF AN ELECTRICAL CIRCUIT AGAINST REVERSAL OF POLARITY, METHOD, CIRCUIT ARRANGEMENT AND VEHICLE SYSTEM

(71) Applicant: Brose Fahrzeugteile GmbH & Co., Kommanditgesellschaft, Wuerzburg (DE)

(72) Inventor: Stefan Zick, Volkach (DE)

(73) Assignee: Brose Fahrzeugteile GmbH & Co., Kommanditgesellschaft, Wuerzburg, Wuerzburg (DE)

( * ) Notice: Subject to any disclaimer, the term of this patent is extended or adjusted under 35 U.S.C. 154(b) by 139 days.

(21) Appl. No.: 13/836,568

(22) Filed: Mar. 15, 2013

(65) Prior Publication Data

US 2013/0242444 A1 Sep. 19, 2013

(30) Foreign Application Priority Data

Mar. 19, 2012 (DE) .................. 10 2012 204 333

(51) Int. Cl.
*H02H 3/00* (2006.01)
(52) U.S. Cl.
CPC .................................... *H02H 3/003* (2013.01)
(58) Field of Classification Search
CPC ........................................................ H02H 3/18
USPC ........................................................ 361/84
See application file for complete search history.

(56) References Cited

U.S. PATENT DOCUMENTS

| 4,942,310 A * | 7/1990 | Renggli et al. ............... 327/100 |
| 7,656,137 B2 * | 2/2010 | Lacombe et al. ............. 323/250 |
| 2008/0247108 A1 * | 10/2008 | Ando et al. ..................... 361/84 |

FOREIGN PATENT DOCUMENTS

| DE | 40 31 288 C1 | 11/1991 |
| DE | 10 2008 043 424 A1 | 5/2010 |
| DE | 10 2008 056 864 A1 | 5/2010 |

OTHER PUBLICATIONS

German Office Action for German Patent Application No. 10 2012 204 333.0, dated Mar. 20, 2013, 10 pages.

*Primary Examiner* — Thienvu Tran
*Assistant Examiner* — Tien Mai
(74) *Attorney, Agent, or Firm* — Westman, Champlin & Koehler, P.A.

(57) ABSTRACT

The present invention relates to a protective device for protection of an electrical circuit equipped with a smoothing capacitor against reversal of polarity of the input voltage, with an input via which the protective device can be connected to a voltage supply for coupling in an input voltage, with an output via which the protective device an be connected to the electrical circuit to be protected, with a controllable switch which is arranged between an input terminal of the input and an output terminal of the output having the same polarity and which is designed to interrupt a current flow between the input terminal and the output terminal which are connected to one another, and with a control unit which is designed to control the controllable switch, when an applied input voltage with reverse polarity is detected, in such a way that the interruption of the current flow takes place with a time lag relative to a time of the application of the input voltage with reverse polarity. The present invention further relates to a corresponding method, a circuit arrangement with a protective device according to the invention and a vehicle system.

19 Claims, 3 Drawing Sheets

PROTECTIVE DEVICE FOR PROTECTION OF AN ELECTRICAL CIRCUIT AGAINST REVERSAL OF POLARITY, METHOD, CIRCUIT ARRANGEMENT AND VEHICLE SYSTEM

CROSS-REFERENCE TO RELATED APPLICATION

This Application claims priority to German Application No. 10 2012 204 333.0, filed on Mar. 19, 2012, in German, the contents of which are hereby incorporated by reference in their entirety.

FIELD OF THE INVENTION

The present invention relates to a protective device for protection of an electrical circuit equipped with a smoothing capacitor against reversal of polarity of the input voltage. The present invention further relates to a corresponding method, a circuit arrangement with a protective device according to the invention and a vehicle system.

TECHNICAL BACKGROUND

Electrical circuits are used nowadays in a multiplicity of different applications and functions. For operation of the respective electrical circuit, these circuits are usually connected to a voltage source which provides the input voltage necessary for operating the said electrical circuit.

Depending upon the type of electrical circuit and in particular upon the electrical and electronic components employed in the electrical circuit, the correct polarity of the electrical input voltage which the voltage source provides is crucial for the operation of the electrical circuit. In particular in electrical circuits which are operated with a d.c. voltage, if the input voltage is supplied with incorrect polarity to an electrical circuit this may lead not only to a malfunction of the electrical circuit but also to the destruction of electrical or electronic components of the electrical circuit. In order to prevent such a malfunction of the electrical circuit or a destruction of electrical or electronic components, various types of protective circuits exist, which protect an electrical circuit against the consequences of an input voltage with reverse polarity.

Although the present invention is applicable to a large number of electrical circuits and in a large number of fields of use, the present invention is explained in greater detail below with respect to vehicle systems.

In a motor vehicle a reversal of polarity of the input voltage may be caused for example when a battery is changed or when jump-starting. A very simple and cost-effective possibility for protecting an electrical circuit against the consequences of an input voltage with reverse polarity consists of arranging a diode in the pass direction in a supply line of the electrical circuit. A further possibility consists of connecting a rectifier comprising four diodes between the electrical circuit and the voltage source.

However, a disadvantage of the use of diodes as protection against reverse polarity is that there is a power loss in the diodes and a voltage drop occurs on each of the diodes. This leads to a deterioration in the efficiency of the electrical circuit.

In order to reduce the disadvantages of the use of diodes for protection of an electrical circuit against the consequences of an input voltage with reverse polarity, MOSFETs are frequently used which are arranged in the supply branch of the electronic circuit which carries a positive potential with respect to earth. In this case the MOSFET which controls the electrical supply to the electrical circuit is only actuated when the function of the electrical circuit is actually to be used. This means that the electrical circuit is disconnected when its function is not used.

In a vehicle the reversal of polarity of the electrical input voltage usually takes place when a plurality of the electrical circuits installed in the vehicle is not required. Therefore with a conventional protection against reverse polarity based on a MOSFET the electrical circuits of the vehicle are typically deactivated at such a moment. In this way the MOSFET which serves for protection of the electrical circuit is prevented from overloading in the event of a suddenly reversal of polarity of the electrical input voltage by an electrical current flowing out of the electrical circuit, so that this may become incapable of functioning. If the electrical input voltage of the electrical circuit is reversed in polarity with the MOSFET activated, then a very high current would also flow out of the electrical circuit through the MOSFET. If the MOSFET were disconnected at this moment in order to prevent damage to the electrical circuit, the MOSFET would be destroyed because of the high current to be switched.

If MOSFETs are used as protection against reverse polarity, both P-channel MOSFETs and also N-channel MOSFETs can be used.

In the case of a protection against reverse polarity constructed as a P-channel MOSFET, this can be arranged without costly additional wiring in the supply branch of the electronic circuit which is provided for the purpose carrying a positive potential with respect to earth. However, a disadvantage of P-channel MOSFETs is that whilst they have the same power as a comparable N-channel MOSFET they must have significantly larger dimensions and therefore are also substantially more expensive.

On the other hand, if a smaller and thereby more cost-effective N-channel MOSFET transistor is used as protection against reverse polarity, a complex charge pump circuit is necessary in order to raise the potential at the control input of the N-channel MOSFET transistor above the potential at the source terminal of the N-channel MOSFET transistor.

A protection against reverse polarity, with an N-channel MOSFET, which is arranged in the supply branch of the electronic circuit provided to carry an earth potential or a negative potential with respect to earth, could be designed without additional complex electrical wiring. However, such a protection against reverse polarity cannot be used because this supply branch usually also constitutes the earth connection the electronic circuit. This in turn is necessary in order for example to be able to transmit control commands to the electronic circuit and therefore should not be interrupted regularly, as described above.

However, if this supply line is not interrupted regularly, in the event of a suddenly reversal of polarity of the input voltage the electrical circuit of the N-channel MOSFET is overloaded. Overloading of the N-channel MOSFET is possible in particular when the electrical circuit has a high-capacitance smoothing capacitor which is discharged very quickly by a high discharge current when the polarity of the input voltage is reversed.

SUMMARY OF THE INVENTION

It is therefore an attempt of the present invention to provide a less complex possibility for protecting an electrical circuit against the consequences of a reversal of polarity of the input voltage.

According to the invention this object is achieved by a protective device having the features of Claim 1, a method having the features of Claim 12, a circuit arrangement having the features of Claim 16 and/or a vehicle system having the features of Claim 19.

Accordingly the following are provided:

A protective device for protection of an electrical circuit equipped with a smoothing capacitor against reversal of polarity of the input voltage, comprising an input via which the protective device can be connected to a voltage supply for coupling in an input voltage; an output via which the protective device can be connected to the electrical circuit to be protected; a controllable switch which is arranged between an input terminal of the input and an output terminal of the output having the same polarity and which is designed to interrupt a current flow between the input terminal and the output terminal which are connected to one another; and a control unit which is designed to control the controllable switch, when an applied input voltage with reverse polarity is detected, in such a way that the interruption of the current flow takes place with a time lag relative to a time of the application of the input voltage with reverse polarity.

A method for protection of an electrical circuit equipped with a smoothing capacitor against reversal of polarity of the input voltage, comprising the steps of: providing a controllable switch in the positive supply branch for a positive supply potential or in the negative supply branch for a negative supply potential between the electrical circuit to be protected and a voltage supply, wherein the controllable switch is designed to interrupt the positive or the negative supply branch in the event of a reversal of polarity of the input voltage being detected; detecting a reversal of polarity of the input voltage; controlling the controllable switch in the event of a reversal of polarity being detected in such a way that the interruption of the positive or of the negative supply branch takes place with a time lag relative to the time of the detection of the input voltage with reverse polarity.

A circuit arrangement, comprising: an electrical circuit, which has a smoothing capacitor arranged between two input terminals of differing polarity of an input of the electrical circuit; a voltage supply which has an input voltage for supplying the electrical circuit; at least one protective device which is arranged between the voltage supply and the electrical circuit and which is designed to protect the electrical circuit against reversal of polarity of the input voltage.

A vehicle system, which is equipped with a protective device according to the invention and/or a circuit arrangement according to the invention.

The knowledge on which the present invention is based resides in the fact that it is very expensive to disconnect an electrical circuit for protection of the electrical circuit against reversal of polarity of the input voltage every time when the electrical circuit is not required. The idea underlying the present invention consists of taking this knowledge into account and providing a possibility for protection of an electrical circuit in a very simple manner against reversal of polarity of the input voltage, without this having to be disconnected regularly when the operation of the electrical circuit is not required.

At the moment of application of an input voltage with reverse polarity to an electrical circuit equipped with smoothing capacitor, very high current flows out of the smoothing capacitor through the controllable switch. If the controllable switch is actuated at this moment in such a way that the current flow out of the smoothing capacitor is interrupted, the controllable switch could be destroyed. In order to prevent this, the present invention provides a control device which actuates the controllable switch with a time lag at the moment of application of the input voltage with reverse polarity. If the controllable switch is actuated in this way with a time lag, the current from the smoothing capacitor can decay before the controllable switch interrupts the current flow. Destruction of the controllable switch because of a high current flow at the moment of disconnection is effectively prevented thereby.

The present invention also makes it possible to dimension the controllable switch for a small cut-off current. This facilitates a compact and cost-efficient construction of the protective device according to the invention.

Other embodiments and modifications are apparent from the subordinate claims and also from the description with reference to the drawings.

In one embodiment the delay unit has at least one resistor and a capacitive element. These switching elements are connected to the controllable switch in such a way that the control input of the controllable switch can also be actuated after the application of an input voltage with reverse polarity by the electrical power stored by the capacitive element. This facilitates a less complex and very robust construction of the protective device according to the invention.

In one embodiment the capacitive element and the resistor are dimensioned in such a way that after application of an input voltage with reverse polarity the control input of the controllable switch can still be actuated until the current flowing out of the smoothing capacitor of the electrical circuit through the load path of the controllable switch has decayed, before the electrical power stored in the capacitive element is reduced to a cut-off level. The cut-off level is dimensioned in such a way that when the power falls below the cut-off level this leads to disconnection of the controllable switch. This ensures that no destruction of the controllable switch takes place when the electrical circuit is isolated from the voltage supply.

In one embodiment a polarity reversal sensor is provided which is designed to detect a reversal of polarity of the input voltage. This makes it possible to detect a reversal of polarity of the input voltage quickly and to adapt actuation of the controllable switch accordingly.

In one embodiment a current sensor is provided which is designed to measure the current between the positive input terminal and the positive output terminal or between the negative input terminal and the negative output terminal. This makes it possible to determine the moment to actuate the controllable switch based upon the present measured value for the current flowing through the switch.

In one embodiment the control unit has a threshold value circuit which is designed to control the controllable switch, when an applied input voltage with reverse polarity is detected, in such a way that an interruption of the current flow only takes place when the measured current falls below a predetermined limiting value. This makes it possible to determine exactly the moment to actuate the controllable switch.

In one embodiment the controllable switch is designed as a power switch, in particular a power MOSFET. This facilitates the simple construction of a protective device with components which are easily obtainable in different designs and for different applications.

In one embodiment a positive and a negative supply branch are provided so that an electrical circuit coupled to the output of the protective device can be coupled to a positive or a negative supply potential of the input voltage.

In one embodiment the controllable switch is designed as an N-channel power MOSFET arranged in the positive supply branch and a voltage transformer device is provided which is designed to provide a positive control potential with respect to the source terminal of the N-channel power MOSFET on the control input of the N-channel power MOSFET. This enables the use of cost-effective N-channel MOSFETs in the protective device.

In one embodiment the controllable switch is designed as an N-channel power MOSFET which is arranged in the negative supply branch of the electrical circuit. This enables the use of cost-effective N-channel MOSFETs without the need to use further complex electrical circuit components.

In one embodiment the circuit arrangement is designed as a vehicle control device. This enables the use of the protective device according to the invention in a plurality of applications. For example the protective device according to the invention can be used in control devices for private cars.

The above configurations and modifications can be combined with one another in any sensible way. Further possible configurations, modification and implementations of the invention also comprise combinations, not explicitly mentioned, of features of the invention previously described or described below in relation to the embodiments. In particular the person skilled in the art will also add individual aspects as improvements or additions to the particular basic form of the present invention.

BRIEF DESCRIPTION OF THE DRAWINGS

The present invention is explained in greater detail below with reference to the embodiments shown in the schematic figures of the drawings. In the drawings.

In all Figures all elements and devices which are the same or perform the same functions—unless stated otherwise—are identified by the same reference numerals.

DESCRIPTION OF EXEMPLARY
EMBODIMENTS

Figure 1:
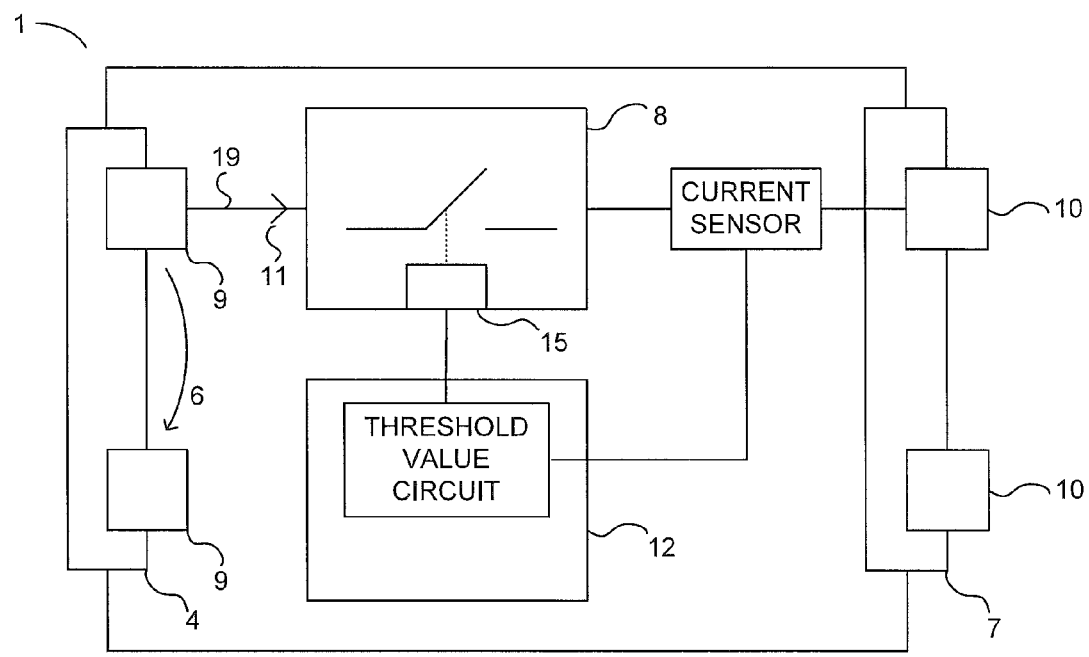
FIG. 1 shows a block diagram of an embodiment of a protective device 1 according to the invention.

FIG. 1 shows a block diagram of an embodiment of a protective device 1 according to the invention.

The protective device 1 has an input 4 which has two input terminals 9. The protective device 1 also has an output 7 which has two output terminals 10. One of the input terminals 9 is designed to be coupled to a positive potential of the input voltage 6 and the other input terminal 9 is designed to be coupled to a negative potential of the input voltage 6. A corresponding output terminal 10 is associated with each of the input terminals 9.

The input terminal 9 which is designed to be coupled to a positive potential of the input voltage 6 is coupled via a supply branch 19 to the controllable switch 8 which is coupled to the corresponding output terminal 10.

Finally, the protective device 1 has a control unit 12 which is coupled to the controllable switch 8.

For reasons of clarity FIG. 1 does not show any electrical connection between the input terminal 9 which is designed to be coupled to a negative potential of the input voltage 6 and the corresponding output terminal 10. In a further embodiment, in contrast to the representation in FIG. 1, the controllable switch 8 is arranged in the supply branch 19 by which the input terminal 9, which is designed to be coupled to a negative potential of the input voltage 6, is connected to the corresponding output terminal 10.

The control unit 12 is designed as a passive control unit 12. This means that the control unit 12 only has passive electrical components, such as e.g. coils, capacitors, resistors and the like.

In such an embodiment a coil 14 for example stores electrical power in the form of a magnetic field, whilst an input voltage 6 with correct polarity is applied to the protective device 1. If the polarity of the input voltage 6 applied to the protective device 1 is reversed, then the control input 15 of the controllable switch 8 is still actuated by power stored in the coil 14.

If the passive electrical components of the control unit 12 are appropriately dimensioned, it can be ensured that at the moment of disconnection of the controllable switch 8 only a current flows through the controllable switch 8 which is less than the maximum acceptable cut-off current of the controllable switch 8.

In a further embodiment the control unit 12 is designed as an active control unit 12.

In such an embodiment the protective device 1 can have a polarity reversal sensor and a current sensor which are coupled to a control unit 12 designed as a microcontroller 12.

The microcontroller 12 is designed to actuate the control input 15 of the controllable switch 8 as a function of the measured values of the polarity reversal sensor and of the current sensor.

In one embodiment the microcontroller 12 is designed to further actuate the control input 15 of the controllable switch 8 for a specified time after the recognition of an input voltage 6 with reverse polarity by the polarity reversal sensor. In yet another embodiment the microcontroller 12 is designed to further actuate the control input 15 of the controllable switch 8 for a time after the recognition of an input voltage 6 with reverse polarity until the value output by the current sensor for the current flowing through the controllable switch 9 has fallen below a specified threshold value.

Figure 2:
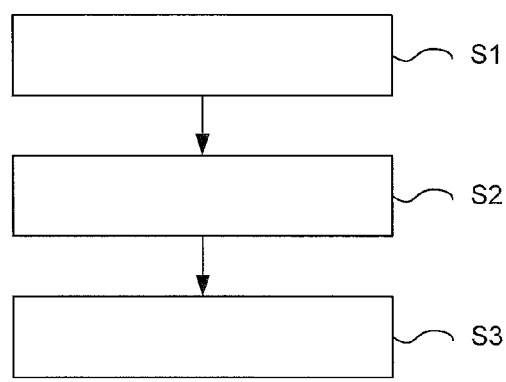
FIG. 2 shows a flow diagram of an embodiment of a method according to the invention.

FIG. 2 shows a flow diagram of a method according to the invention.

In a first step S1 a reversal of polarity of the input voltage 6 is detected.

In a second step S2 a controllable switch 8 is provided in the positive supply branch 19 for a positive supply potential or in the negative supply branch 19 for a negative supply potential between the electrical circuit 3 to be protected and a voltage supply 5, wherein the switch is designed to interrupt the positive or the negative supply branch 19 in the event of a reversal of polarity of the input voltage 6 being detected In a third step S3 the controllable switch 8 is actuated in such a way that the interruption of the positive or of the negative supply branch 19 takes place with a time lag with respect to the time of application of the input voltage 6 with reverse polarity.

Figure 3:
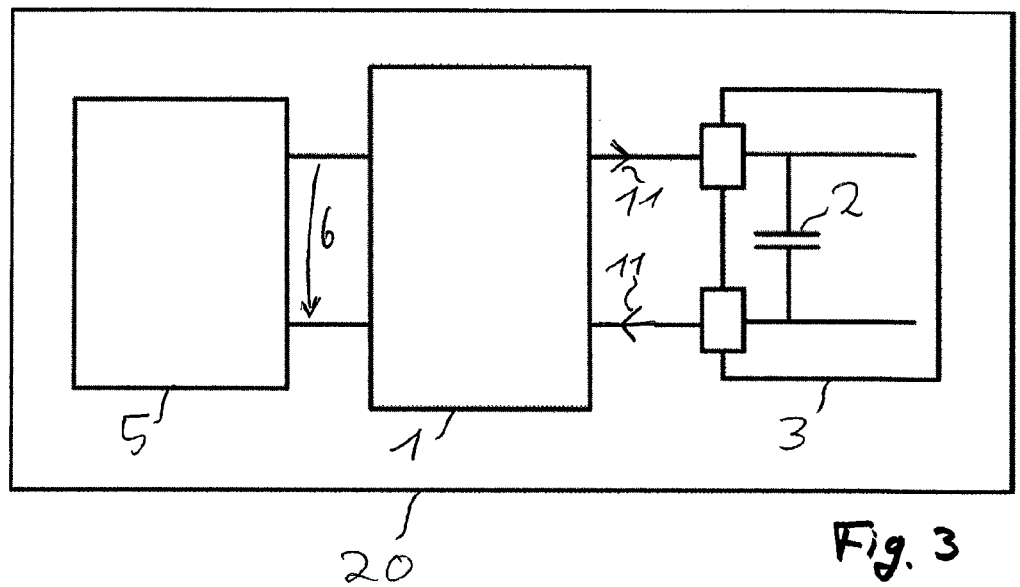
FIG. 3 shows a block diagram of an embodiment of a circuit arrangement according to the invention.

FIG. 3 shows a block diagram of an embodiment of a circuit arrangement 20 according to the invention.

The circuit arrangement 20 in FIG. 3 has an electrical circuit 3 designed as a vehicle control device 3, e.g. as a fan control device 3. Furthermore the circuit arrangement 20 has a protective device 1 which is arranged electrically between a voltage supply 5 which provides an input voltage 6 and the electrical circuit 3.

The electrical circuit 3 has a smoothing capacitor 2 which is coupled electrically between a positive and a negative input terminal of the electrical circuit 2.

Figure 4:
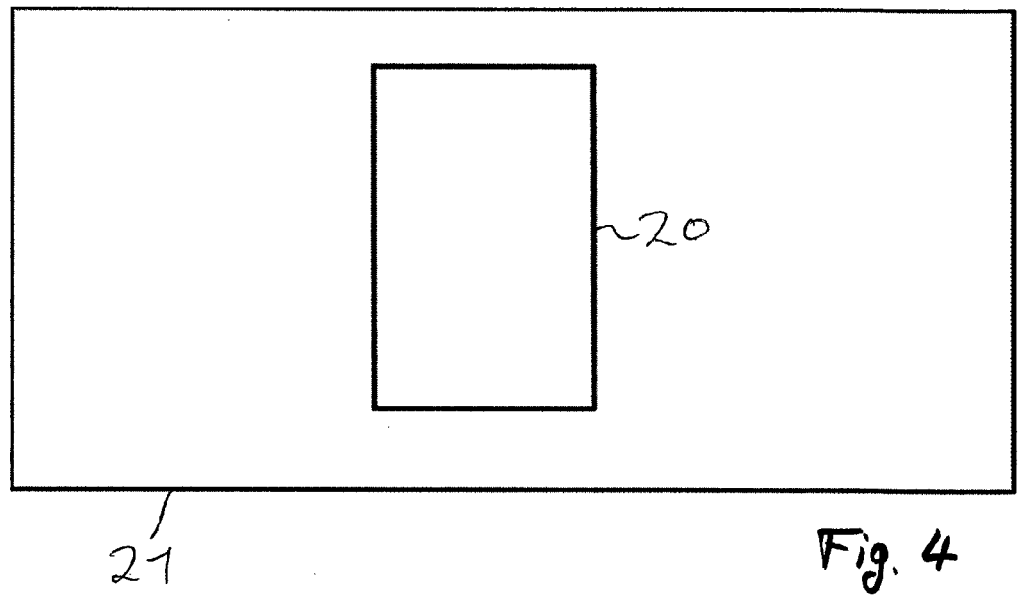
FIG. 4 shows a block diagram of an embodiment of a vehicle system according to the invention.

FIG. 4 shows a block diagram of an embodiment of a vehicle system 21 according to the invention.

The vehicle system 21 designed as a cooling fan system 21 in FIG. 4 has a circuit arrangement 20 according to the invention.

In a further embodiment the vehicle system 21 is designed as an ESP system (electronic stability program) or the like.

Figure 5:
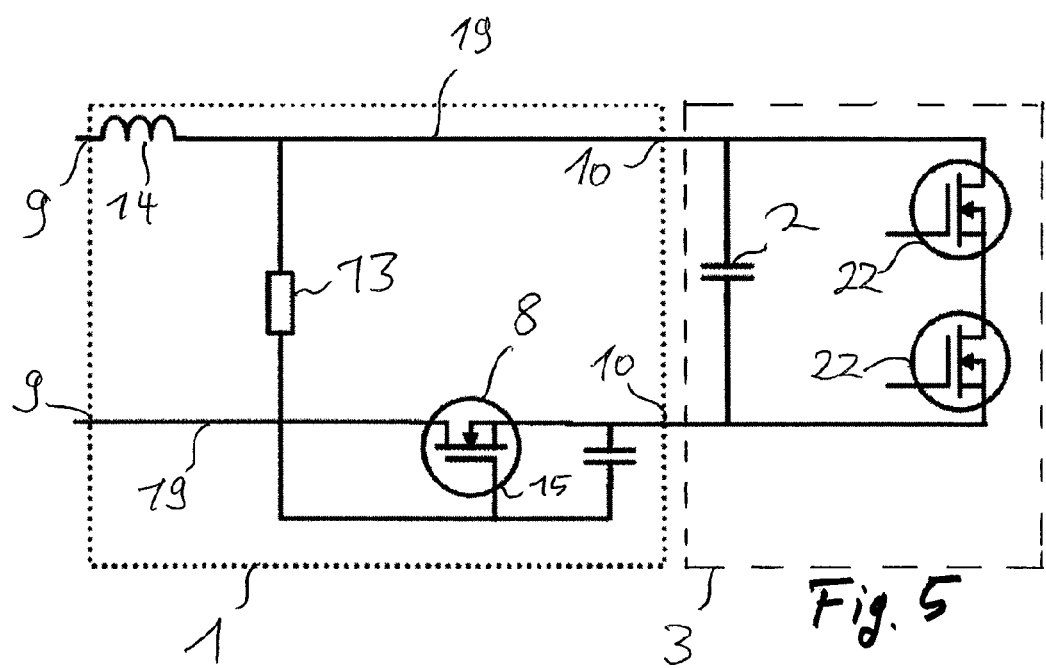
FIG. 5 shows a block diagram of a further embodiment of a protective device 1 according to the invention.

FIG. 5 shows a block diagram of a further embodiment of a protective device 1 according to the invention.

The protective device 1 in FIG. 5 has an inductive element 14 in a supply branch 19 which is coupled to an input terminal 9, which is designed to be coupled to a positive potential of the input voltage 6, and to the corresponding output terminal 10. The controllable switch 8 is arranged between the input terminal 9 and the output terminal 10 in the supply branch 19 which is coupled to an input terminal 9, which is designed to be coupled to a negative potential of the input voltage 6, and to the corresponding output terminal 10. The controllable switch 8 is designed here as an N-channel MOSFET 8. A capacitive element 16 is arranged between the control terminal 15 of the N-channel MOSFET 8 and the load output which is connected to the output terminal 10. The capacitive element 16 is designed as a capacitor 16.

Furthermore a resistor 13 is arranged between the control input of the N-channel MOSFET and a junction between the inductive element 14 and the corresponding output terminal 10.

Finally a capacitor is arranged between the control input of the N-channel MOSFET 8 and a junction between the N-channel MOSFET 8 and the corresponding output terminal 10.

The protective device 1 in FIG. 5 is coupled to an electrical circuit 3 which has a smoothing capacitor 2 arranged between the two supply branches 19. The electrical circuit 3 also has 2 power switches 22. In a further embodiment the electrical circuit 3 has a greater number of power switches 22. For example the electrical circuit 3 may have six power switches 22 for actuation of a three-phase motor.

Although the present invention has been described above with reference to preferred embodiments, it is not limited thereto but may be modified in diverse ways. In particular the invention can be altered or modified in various ways without deviating from the crux of the invention.

LIST OF REFERENCE NUMERALS 1 protective device
2 smoothing capacitor
3 electrical circuit
4 input
5 voltage supply
6 input voltage
7 output
8 controllable switch
9 input terminals
10 output terminals
11 current flow
12 control unit
13 resistor
14 inductive element
15 control input
16 capacitive element
19 supply branches
20 circuit arrangement
21 vehicle system
22 power switch

The invention claimed is:

1. A protective device for protection of an electrical circuit equipped with a smoothing capacitor against reversal of polarity of the input voltage, comprising:
an input via which the protective device is connectable to a voltage supply for coupling in an input voltage;
an output via which the protective device is connectable to the electrical circuit to be protected;
a controllable switch which is arranged between an input terminal of the input and an output terminal of the output having the same polarity and which is designed to interrupt a current flow between the input terminal and the output terminal which are connected to one another; and
a control unit which is designed to control the controllable switch, when an applied input voltage with reverse polarity is detected, in such a way that the interruption of the current flow takes place with a time lag relative to a time of the application of the input voltage with reverse polarity such that the current from the smoothing capacitor decays before the controllable switch interrupts the current flow,
wherein a positive input of the smoothing capacitor is directly connected to a positive input terminal of the electrical circuit and a negative input of the smoothing capacitor is directly connected to a negative input terminal of the electrical circuit.

2. The device of claim 1, wherein the delay unit comprises at least one resistor and at least one capacitive element which are connected to the controllable switch in such a way that the control input of the controllable switch is operable to be actuated after the application of an input voltage with reverse polarity on the basis of the electrical power stored by the capacitive element.

3. The device of claim 2, wherein the capacitive element and the resistor are dimensioned in such a way that after application of an input voltage with reverse polarity the control input of the controllable switch is operable to be actuated until the current flowing out of the smoothing capacitor of the electrical circuit through the load path of the controllable switch has decayed, before the electrical power stored in the capacitive element is reduced to a cut-off level.

4. The device of claim 1, wherein a polarity reversal sensor is provided which is designed to detect a reversal of polarity of the input voltage.

5. The device of claim 1, wherein a current sensor is provided which is designed to measure the current flowing between the positive input terminal and the positive output terminal or between the negative input terminal and the negative output terminal.

6. The device of claim 5, wherein the control unit comprises a threshold value circuit which is designed to control the controllable switch when an applied input voltage with reverse polarity is detected, in such a way that an interruption of the current flow only takes place when the measured current falls below a predetermined limiting value.

7. The device of claim 1, wherein the controllable switch is designed as an integrated power switch.

8. The device of claim 1, wherein the controllable switch is designed as a power MOSFET or as a power JFET or as an IGBT.

9. The device of claim 1, wherein a positive and a negative supply branch are provided so that an electrical circuit coupled to the output of the protective device is operable to be coupled to a positive or a negative supply potential of the input voltage.

10. The device of claim 9, wherein the controllable switch is designed as an N-channel power MOSFET arranged in the positive supply branch and wherein a device is provided which is designed to provide a positive control potential with respect to the source terminal of the N-channel power MOSFET on the control input of the N-channel power MOSFET.

11. The device of claim 9, wherein the controllable switch is designed as an N-channel power MOSFET arranged in the negative supply branch of the electrical circuit.

12. A method for protection of an electrical circuit equipped with a smoothing capacitor against reversal of polarity of the input voltage, comprising the steps of:
   providing a controllable switch in the positive supply branch for a positive supply potential or in the negative supply branch for a negative supply potential between the electrical circuit to be protected and a voltage supply, wherein the controllable switch is designed to interrupt the positive or the negative supply branch in the event of a reversal of polarity of the input voltage being detected;
   detecting a reversal of polarity of the input voltage; and
   actuating the controllable switch in the event of a reversal of polarity being detected in such a way that the interruption of the positive or the negative supply branch takes place with a time lag relative to the time of detection of the input voltage with reverse polarity such that the current from the smoothing capacitor decays before the controllable switch interrupts the current flow, wherein a positive input of the smoothing capacitor is directly connected to a positive input terminal of the electrical circuit and a negative input of the smoothing capacitor is directly connected to a negative input terminal of the electrical circuit.

13. The method of claim 12, wherein a capacitive element is coupled to a control input of the controllable switch in such a way that after the application of an input voltage with reverse polarity the control input of the controllable switch is still actuated in such a way that the current flowing out of the smoothing capacitor through the switch has decayed before the electrical power stored in the capacitive element is reduced.

14. The method of claim 12, comprising the step of measuring current flowing in a positive or a negative supply branch.

15. The method of claim 12, comprising the step of controlling the controllable switch in such a way that an interruption of the positive or the negative supply branch takes place exactly when the measured current falls below a predetermined limiting value when an applied input voltage with reverse polarity is detected.

16. A circuit arrangement, comprising:
   an electrical circuit, which has a smoothing capacitor arranged between two input terminals of differing polarity of an input of the electrical circuit;
   a voltage supply which has an input voltage for supplying the electrical circuit; and
   at least one protective device which is arranged between the voltage supply and the electrical circuit and which is designed to protect the electrical circuit against reversal of polarity of the input voltage;
   wherein the protective device is designed to be a protective device for protection of an electrical circuit equipped with a smoothing capacitor against reversal of polarity of the input voltage, the protective device comprising:
      an input via which the protective device is operable to be connected to a voltage supply for coupling in an input voltage;
      an output via which the protective device is operable to be connected to the electrical circuit to be protected;
      a controllable switch which is arranged between an input terminal of the input and an output terminal of the output having the same polarity and which is designed to interrupt a current flow between the input terminal and the output terminal which are connected to one another; and
      a control unit which is designed to control the controllable switch, when an applied input voltage with reverse polarity is detected, in such a way that the interruption of the current flow takes place with a time lag relative to a time of the application of the input voltage with reverse polarity such that the current from the smoothing capacitor decays before the controllable switch interrupts the current flow, wherein a positive input of the smoothing capacitor is directly connected to a positive input terminal of the electrical circuit and a negative input of the smoothing capacitor is directly connected to a negative input terminal of the electrical circuit.

17. The circuit arrangement of claim 16, wherein the electrical circuit is a vehicle control device.

18. A vehicle system, which is equipped with a protective device for protection of an electrical circuit equipped with a smoothing capacitor against reversal of polarity of the input voltage, the protective device comprising:
   an input via which the protective device is operable to be connected to a voltage supply for coupling in an input voltage;
   an output via which the protective device is operable to be connected to the electrical circuit to be protected;
   a controllable switch which is arranged between an input terminal of the input and an output terminal of the output having the same polarity and which is designed to interrupt a current flow between the input terminal and the output terminal which are connected to one another; and
   a control unit which is designed to control the controllable switch, when an applied input voltage with reverse polarity is detected, in such a way that the interruption of the current flow takes place with a time lag relative to a time of the application of the input voltage with reverse polarity such that the current from the smoothing capacitor decays before the controllable switch interrupts the current flow, wherein a positive input of the smoothing capacitor is directly connected to a positive input terminal of the electrical circuit and a negative input of the smoothing capacitor is directly connected to a negative input terminal of the electrical circuit.

19. The system of claim 18, which is configured to form a cooling fan system.

* * * * *